Dec. 20, 1960  G. C. HOWARD ET AL  2,965,171
CEMENTING CASING
Filed July 29, 1957

INVENTORS
GEORGE C. HOWARD
CHARLES R. MILAM
BY *C. Goodwin*
ATTORNEY

United States Patent Office 2,965,171
Patented Dec. 20, 1960

2,965,171

CEMENTING CASING

George C. Howard, Tulsa, and Charles R. Milam, Sand Springs, Okla., assignors to Pan American Petroleum Corporation, Tulsa, Okla., a corporation of Delaware Filed July 29, 1957, Ser. No. 674,875

10 Claims. (Cl. 166—29)

This invention relates to the art of cementing casing and more particularly to a method and apparatus for placing a cement additive in a cement slurry after the cement slurry has been injected into a well.

Hydraulic cements including gypsum and Portland cements have been injected into wells for a number of purposes including setting pipe, shutting off water and the like and various additives have been incorporated in these hydraulic cements to provide improved physical properties which specially adapt the slurry to the various uses. For example, set retarders and accelerators and water loss retarders have been added to cements, mixing water, or cement slurries before these slurries are injected into a well.

Figure 1:
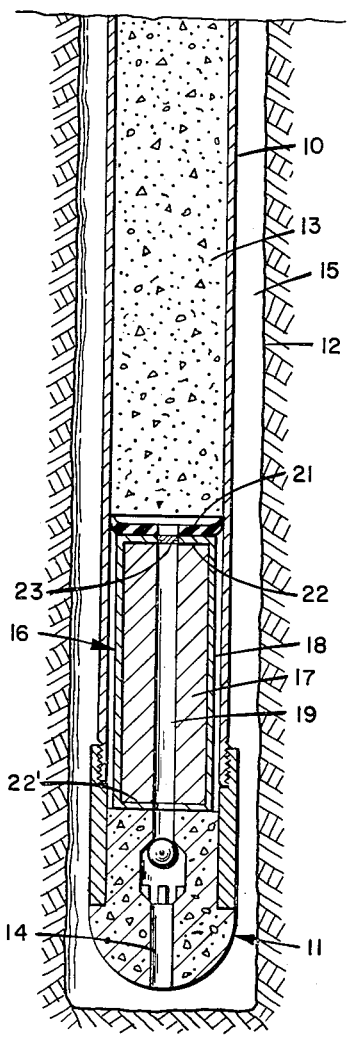
Figure 2:
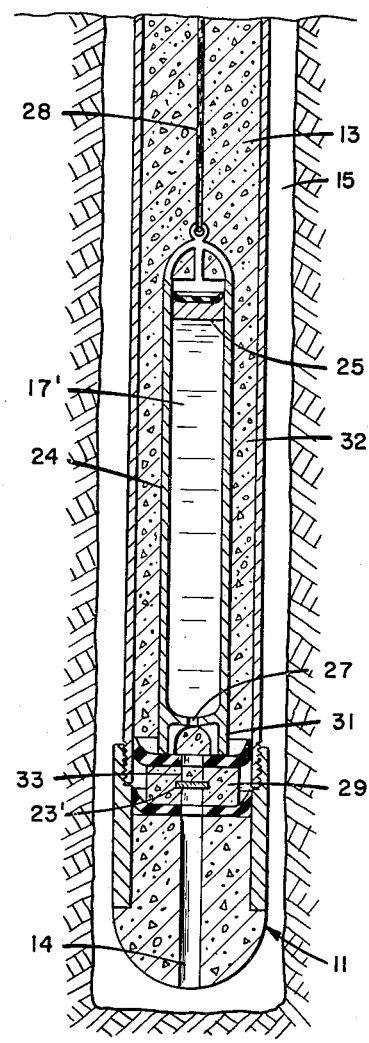

It is an object of this invention to provide an improved method and apparatus for modifying the properties of a well cementing composition. It is also an object of this invention to provide an improved method and apparatus for disposing a cement additive in a hydraulic cement within a well. It is a more specific object of this invention to provide an improved method for cementing a casing in a well by injecting an aqueous slurry of the hydraulic cement into the well and then, at the time the slurry is ejected from the casing, incorporating in the cement an additive which will modify the physical and/or chemical properties of the slurry. Other objects of this invention will become apparent from the following description in which:

Figure 1 is a cross-sectional view of the lower section of a well including a casing and showing means for modifying the properties of a cement composition before the composition is ejected from the casing; and Figure 2 is a cross-sectional view similar to the view of Figure 1 and showing alternative means for metering a cement additive into a cement slurry as the slurry is displaced from the casing into the well.

This invention may be described generally as a method for cementing casing involving modifying the cement within a well by dispersing an additive in a cement slurry preferably as the slurry is displaced from the casing into the well. In its more specific aspects this invention relates to a method of cementing a casing in a well and involves particularly the injection of a relatively slow setting cement slurry into the upper end of the casing disposed in a well and the addition at or near the lower end of that casing of a set accelerator to the cement slurry as it is displaced from the casing into the well around the casing to cement the casing in the well.

Referring now to Figure 1 for a more detailed description of this invention, a casing 10 having a float collar or shoe 11 at the lower end is initially placed in a well 12 in the normal manner. This casing is cemented in the well in accordance with this invention, by injecting a slurry of relatively slow-set hydraulic cement 13 through the casing, metering a desired additive into the slurry and displacing the slurry through the casing outlet 14 in the shoe 11 and back up through the annulus 15 between the casing and the well wall. A set retarder may be incorporated in the slurry at the surface if desired to provide a sufficiently delayed set. That is, the cement slurry as it is injected into the well preferably contains sufficient set retarder or otherwise has a setting time sufficiently long to provide plenty of time under the temperature and pressure conditions within the well for placing the slurry in the well. In some cases, particularly in relatively shallow wells of less than about 2000–3000 feet, Portland cement can be used without a set retarder. In deeper wells set retarders may be incorporated in the slurry to insure an adequate time for placing this cement plus some added time for certain contingencies such as a breakdown in the pumping equipment and the like. In any case, for safety, it is desirable that the set of the cement as it is injected into the well be delayed from as much as an hour to a day or more. This generally avoids having the cement set in the casing. This delay, while necessary for safety, often causes an otherwise unnecessary delay once the slurry has been displaced out of the casing.

This unnecessary delay is avoided by placing a set accelerator in the slurry as the slurry is discharged from the casing. Accordingly, in this process, when the first of the cement slurry reaches the bottom of the casing, injection of additional cement slurry or of a follower fluid into the casing may be temporarily halted and a quantity of the desired additive, particularly a set accelerator, may be lowered into the casing to a point near the casing outlet. In a preferred embodiment the additive may be displaced into the casing at the leading end of the cement slurry with or in place of the bottom cementing plug.

The additive itself may be cast in a suitable shape and used as the plug or in combination with a typical bottom plug. In a preferred embodiment the two are combined to form a modified bottom plug 16 as shown in Figure 1. In this embodiment the solid additive 17 is enclosed in a casing or can 18 having a cross-sectional area slightly smaller than the cross-sectional area of the opening in casing 10. The cement additive 17 preferably is a thick walled tube or cylinder having an axial opening 19 extending throughout its length. The can may be closed at either one or both ends. A cup-type packer 21 is attached to the upper head 22 or to the bottom head 22' or to both as by rivets, adhesives or the like. The heads and/or the cup-type packer(s) have a partially perforated knockout or shear disc 23 in the center in axial alignment with the opening 19 initially to prevent flow of fluid through the opening and then, when the plug is constrained, to permit flow through the opening. This improved bottom cement plug is placed in the casing at the surface before commencing injection of the cement slurry into the casing. As the slurry is injected, the plug then separates the drilling fluids or other liquid in the casing from the cement slurry and prevents contamination of the leading end of the slurry as it travels down the well. After the fluid ahead of the cement slurry has been displaced through the casing outlet 14 and up into the annulus 15, the plug 16 is stopped by the casing shoe 11. By continuing the injection of cement slurry, or of a follower liquid, therefor into the upper end of the casing 10, the knockout or frangible disc in the head or heads of the can or in the opening 19 is ruptured and the cement slurry flows down through the opening, the casing outlet and up around the casing into the annulus 15. As the aqueous cement slurry passes through the opening 19 it contacts the additive 17 and some of the additive is dissolved and/or eroded away by the cement slurry and blended or metered into the slurry.

The additive 17 may be any material capable of affecting the properties of the cement. In the preferred embodiment this additive, however, is a cement set accelerator. Typical set accelerators in the case of Portland cement are the alkanol amines and the alkaline earth metal and alkali metal chlorides, carbonates and silicates and particularly the metal chlorides such as sodium chloride and calcium chloride. In the case of gypsum cement, a typical accelerator is boric acid. These may be cast in the form of a thick walled tube or longitudinally perforated cylinder as indicated. Initially the cross-sectional area of the longitudinal openings is relatively small and increases in use due to the dissolving and/or eroding away of the additive. The length of the solid additive depends generally upon the quantity of additive desired which in turn depends upon the amount of slurry and the desired concentration of additive in the slurry. Typically the volume of the additive is in the range of about two to ten percent of the volume of the slurry.

It is sometimes desirable to vary the ratio of additive to cement slurry as the job progresses so that the complete cement slurry tends to set almost simultaneously. That is, while the ratio may be varied by varying the flow rate, in the case of a cement additive having an axial opening or even a multiplicity of small openings longitudinally of the cement, the concentration of the additive in the slurry may be varied with time by various means. Since these additives typically accelerate the set of the cement in proportion to the concentration of the additive in the cement slurry, if the set of the first part of the cement is to be delayed to set simultaneously with the last part of the slurry, the last of the cement slurry should contain a greater concentration of the additive than the first of the slurry. In one embodiment the solubility of the additive may be varied to proportion the concentration of the additive in the desired manner. For example, the material near the longitudinal opening may be made less soluble than the material near the periphery of the additive. This may be accomplished by mixing with the additive various materials which will change the solubility of the mass, or the composition of the additive may be varied radially. In one embodiment calcium chloride, which is highly soluble in an aqueous slurry, may form the periphery of the additive plug and sodium chloride, which is less soluble, may be used for forming the center or heart of the plug next to the opening or openings 19. The less soluble additive on the inside may be gradually graded into the more soluble additive near the periphery so that the change in solubility radially is substantially uniform and therefore the concentration of additive in the slurry gradually increases to a maximum at the end of the job.

After all of the cement slurry has been treated with additive in the well and displaced through the casing outlet, the cement is allowed to set in annulus 15. Any cement and/or additive remaining in the bottom of the casing may be drilled out or may be left in the bottom of the casing in accordance with the usual practice using ordinary cementing plugs.

Various other devices and methods for dispersing or metering a cement additive into a cement slurry at the bottom of a casing or near any other casing outlet will be apparent. One embodiment of an apparatus which is particularly suitable for use with liquid additives such as the water soluble amines or water solutions of the metal salts is shown in Figure 2. In this embodiment the liquid additive 17' is lowered into the casing in a bailer 24 to a point near the casing outlet. The bailer may be open at the top or may be closed at the top with a free piston type closure 25 which follows the interface between the liquid additive 17' and the cement slurry 13 and prevents the two from mixing in the bailer. The liquid additive is displaced out of the bottom of the bailer through orifice 27 into the cement slurry. The bailer containing the liquid additive may be dropped into the well or it may be run into the well on a wireline 28 after the bottom cement plug 29 has reached the shoe 11. Alternatively the bottom plug may be attached to or incorporated in the bailer so that the bailer in effect serves as the bottom plug separating the fluid in the hole from the leading edge of the cement slurry and the bailer may be lowered into the wall as the cement slurry is injected into the well. The bailer is preferably provided with feet 31 so that the cement slurry may be displaced around the bailer through the annular space 32 between the bailer and the casing and thence down through the axial opening 33 in the bottom plug 28 and the outlet 14 in shoe 11. The pressure drop of the cement slurry as it flows through annular space 32 provides the necessary force to drive the closure 25 down through the bailer and displace the liquid additive 17' through the orifice 27. As the liquid additive is forced through the orifice it is blended into the cement slurry at the lower end of the bailer as the cement slurry is displaced from the casing. In some cases a dump-type closure valve is used in orifice 27 to prevent loss of the liquid additive until the bailer is set on bottom. Various methods of varying the concentration of the liquid additive in the cement slurry will be apparent. For example, the bottom part of the bailer may contain a relatively weak solution of a dense additive such as calcium chloride and a rich solution of a less dense additive such as sodium chloride may be placed in the top. The concentrations of the various additives in the bailer may be adjusted so that even at a uniform flow rate the proportion of additive is such that the cement slurry, after it is placed in the annulus 15 surrounding the casing, will tend to set substantially simultaneously at the upper and lower ends.

From the foregoing it can be seen that whereas prior to this invention it has been necessary in order to provide a proper safety factor and prevent cement from setting in a casing that the set of a cement slurry injected into a well be retarded so much that considerable "waiting on cement" time is lost, a method and apparatus have been provided which permit a considerable saving of time. It can also be seen that by blending the cement additive, particularly a cement set accelerator, into the cement as the cement slurry leaves the casing, the set of the cement can be accelerated to any desired amount to reduce the "waiting on cement" time following a cement job thereby reducing the "rig time" expense and the hazards of cementing casing. It will also be apparent that various modifications may be made in the process and apparatus as described without departing from the spirit of this invention. Such modifications should, therefore, be construed to fall within the spirit and intent of this invention as it is set out in the appended claims.

We claim:

1. A method of cementing a casing in a well comprising disposing near the bottom of said casing a quantity of a water-soluble hydraulic cement set accelerator and displacing an aqueous slurry of hydraulic cement through said casing and into contact with said set accelerator to meter said set accelerator into said slurry as said slurry is displaced out of said casing.

2. A method of cementing casing in a well comprising inserting a bottom cement plug into said casing, injecting an aqueous slurry of hydraulic cement into said casing and displacing said slurry and said bottom cement plug to the lower end of said casing, lowering to the bottom of said casing a quantity of a liquid cement additive adapted to accelerate the set of said hydraulic cement, blending said liquid cement additive into said slurry within said casing, and displacing said slurry out of said casing into said well.

3. A method of cementing a well having a conduit therein comprising injecting an aqueous slurry of hydraulic cement into said conduit, displacing said slurry through said conduit and into said well and, near the outlet of said conduit, blending into said slurry an additive adapted to accelerate the set of said slurry.

4. A method of cementing a well having a conduit therein comprising disposing in said conduit in a position to be contacted by an aqueous slurry of hydraulic cement an additive dispersible in said slurry and adapted to accelerate the set of said slurry when said additive is dispersed in said slurry, and then injecting said slurry into said well and displacing said slurry first past and into contact with said additive to disperse said additive in said slurry and thence into said well.

5. A method according to claim 4 in which said additive is disposed adjacent the outlet of said casing.

6. A method of cementing a well having a conduit therein comprising disposing in the bottom of said conduit a plug of a water-soluble hydraulic cement set accelerator, injecting an aqueous slurry of hydraulic cement into said conduit, and displacing said slurry into contact with and past said plug out of said conduit and into said well.

7. A manufacture comprising an elongated cylindrical plug of a water-soluble material adapted to alter a property of a slurry of hydraulic cement as said slurry is displaced from a cylindrical casing into a well, said plug having a minimum cross-sectional area slightly less than the cross-sectional area of the inside of said casing, a longitudinal opening through said plug for the flow of said slurry, packer means on said plug to prevent flow of said slurry around the periphery of said plug, and frangible means initially to seal said opening and prevent flow of said slurry through said opening until said frangible means is destroyed.

8. A manufacture according to claim 7 including means to vary the rate of solution of said plug in said aqueous slurry as said plug is dissolved in said aqueous slurry.

9. A manufacture according to claim 8 including an axial opening in said plug, a water-soluble first additive adjacent to said opening, and a second additive of different solubility than said first additive disposed outside and around the periphery of said first additive whereby the first part of said slurry contacts said first additive and a latter part of said slurry contacts said second additive.

10. A manufacture according to claim 9 in which said first additive and said second additive are set accelerators for said cement and in which said first additive is slowly soluble in said slurry and said second additive is more soluble than said first additive in said slurry whereby the set of said latter part of said slurry is accelerated more than the set of said first part of said slurry.

References Cited in the file of this patent

UNITED STATES PATENTS

| | | |
|---|---|---|
| 1,836,275 | Siebert | Nov. 21, 1933 |
| 2,338,615 | Armstrong et al. | Jan. 4, 1944 |
| 2,626,778 | Lockett | Jan. 27, 1953 |
| 2,775,302 | Kirkpatrick | Dec. 25, 1956 |
| 2,800,964 | Garrick | July 30, 1957 |
| 2,806,530 | Binkley | Sept. 17, 1957 |